(12) United States Patent
Park

(10) Patent No.: US 9,132,582 B2
(45) Date of Patent: Sep. 15, 2015

(54) APPARATUS AND METHOD FOR MANUFACTURING TRANSPARENT SYNTHETIC RESIN VESSEL WITH INTEGRATED HANDLE

(71) Applicant: Sung Kyu Park, Gyeonsangnam-do (KR)

(72) Inventor: Sung Kyu Park, Gyeonsangnam-do (KR)

( * ) Notice: Subject to any disclaimer, the term of this patent is extended or adjusted under 35 U.S.C. 154(b) by 31 days.

(21) Appl. No.: 14/030,987

(22) Filed: Sep. 18, 2013

(65) Prior Publication Data

US 2015/0079219 A1    Mar. 19, 2015

(51) Int. Cl.
*B29C 49/06* (2006.01)
*B29B 11/08* (2006.01)
*B29C 49/28* (2006.01)
*B29K 101/00* (2006.01)
*B29L 31/00* (2006.01)
*B29C 49/02* (2006.01)

(52) U.S. Cl.
CPC .............. *B29C 49/062* (2013.01); *B29B 11/08* (2013.01); *B29C 49/28* (2013.01); *B29B 2911/14513* (2013.01); *B29C 2049/021* (2013.01); *B29K 2101/00* (2013.01); *B29L 2031/7404* (2013.01)

(58) Field of Classification Search
CPC ............ B29C 2049/021; B29C 49/062; B29B 2911/14513; B29B 11/08
See application file for complete search history.

(56) References Cited

U.S. PATENT DOCUMENTS

| | | | | |
|---|---|---|---|---|
| 4,105,391 A | * | 8/1978 | Aoki | 425/526 |
| 4,604,044 A | * | 8/1986 | Hafele | 425/525 |
| 2007/0272652 A1 | * | 11/2007 | Beale | 215/398 |

FOREIGN PATENT DOCUMENTS

| | | | |
|---|---|---|---|
| FR | 2541622 A1 | * | 8/1984 |
| JP | 2006-315189 | | 11/2006 |
| KR | 100252517 | | 1/2000 |
| KR | 1020020028938 | | 4/2002 |
| KR | 1020040032008 | | 4/2004 |
| KR | 1020110136704 | | 12/2011 |
| WO | WO 9912715 A1 | * | 3/1999 |

* cited by examiner

*Primary Examiner* — Robert B Davis
(74) *Attorney, Agent, or Firm* — IPLA P.A.; James E. Bame

(57) ABSTRACT

An apparatus and a method for manufacturing a transparent synthetic resin vessel with an integrated handle are provided. The transparent synthetic resin vessel manufacturing apparatus includes: an upper mold being vertically movable and having a core and a core block; a fixing plate having rib members; a rotating plate being vertically movable together with the upper mold and having a rotating device for simultaneously molding the handle on one side of a preform and manufacturing a transparent synthetic resin vessel; a fixing member for joining the fixing plate with the rotating plate; a lower mold supplied with molten resin at one side thereof so as to injection-mold the handle; an injection mold for forming the preform into a transparent synthetic resin vessel; and a vessel separator for separating the transparent synthetic resin vessel from the vessel manufacturing apparatus.

5 Claims, 11 Drawing Sheets

APPARATUS AND METHOD FOR MANUFACTURING TRANSPARENT SYNTHETIC RESIN VESSEL WITH INTEGRATED HANDLE

BACKGROUND OF THE INVENTION

The present invention relates to an apparatus and a method for manufacturing a transparent synthetic resin vessel with an integrated handle. More particularly, the present invention relates to an apparatus and a method for manufacturing a transparent synthetic resin vessel with an integrated handle, which can injection-mold a handle in a vessel forming preform and automatically discharge the molded vessel from a mold, thereby manufacturing the transparent synthetic resin vessels on a mass production basis and reducing manufacturing costs because the transparent synthetic resin vessel with the integrated handle is manufactured by just a single process without additional process to attach the handle and being recycled without needing to separate raw materials because the transparent synthetic resin vessel is made from just one material.

In general, beverages of various kinds, water, and cooking oil, soy sources, vinegar, and so on used for cooking are distributed and sold in a state where they are put in plastic bottles molded by processing processes.

Such a process for molding the plastic bottles includes the steps of preforming by injection-molding, heating using a heater, putting the preformed product in a mold of a wanted shape, and blowing it into a wanted shape.

Moreover, till now, when the blowing step of the plastic bottle is finished, a handle for the plastic bottle is molded through a separate processing process, and then, the handle is fixed to a neck portion of the plastic bottle.

However, such a plastic bottle has a problem in that the handle easily falls out due to an unsound fixed portion when external impact or load is applied to the plastic bottle because the handle is not molded integrally during the injection-molding process but is fixed to the plastic bottle after being molded through a separate process.

Furthermore, the conventional plastic bottle has further problems in that material consumption is increased, a difficult process for fixing the handle to the neck portion of the plastic bottle is needed, and it takes lots of working time because the fixed portion, namely, the neck portion to which the handle is fixed must be thicker than other portions in order to endure a load due to fixation.

Additionally, the conventional plastic bottle has another problem in that solidity of the fixed portion is deteriorated due to a material difference because the material of the plastic bottle and the material of the handle are different from each other.

Accordingly, Korean Patent No. 0418290 discloses a plastic container with an integrated handle, which can endure a heavy load, is convenient to pick up and carry a large-capacity plastic container, and is easy to manufacture, and a method of manufacturing the plastic container having the integrated handle which is formed by denting a portion of the side of the plastic container to the inside of the container during the molding process of the plastic container using a blow mold for manufacturing the plastic container.

The means for molding the integrated handle according to the prior art includes: a sliding core disposed inside the mold by drawing and denting a side portion of the plastic container to the inside thereof; sliding core driving means for getting forward or returning the sliding core; a rod for connecting the sliding core and the sliding core driving means with each other; and a core channel for guiding the forward movement or returning of the sliding core by accommodating the sliding core and the rod, the core channel having an opening allowing the sliding core to go into and out of a mold cavity. When the handle is formed to the plastic container, the blow mold for manufacturing the plastic container is drawn to the cavity at high pressure, and a portion of the side of the plastic container before cooling is drawn and dented inwardly or inwardly and upwardly so as to form the handle. However, such a handle molding method has several problems as follows.

The handle molding method has a problem in that it is difficult to correctly form the shape of the handle because a peripheral portion of the handle part is also pushed in when the slide core is pushed in and drawn at high pressure so as to form the handles at both sides of the plastic bottle.

Moreover, the handle molding method has another problem in that the handle may be damaged by weight during the use in the case of a large-capacity plastic bottle because the outer circumference is cooled after being formed thinner than a vertex portion corresponding to the slide while being pushed and pulled when the slide core is pushed inwardly in a state where heat still remains in the plastic container body.

Therefore, Korean Patent No. 0479685 (registered on Mar. 21, 2005) discloses a P.E.T container having handles and an apparatus for forming the handles at both sides of the P.E.T container so that a user can conveniently hold it when he or she picks up or carries it. The apparatus for forming the handles at the P.E.T container includes: a right and left mold which is divided am bilaterally and has a guide hole formed at the center thereof and a space portion formed on the bottom; a lower mold corresponding to the space portion of the bottom of the right and left mold; a sleeve guide joined with the right and left mold and having an inner channel coinciding with the guide hole; a hydraulic cylinder joined to the sleeve guide; and a core adapted for forming handles at both sides of the P.E.T container while moving by a rod of the hydraulic cylinder. Through handle forming apparatus for the P.E.T container, users can handle the P.E.T containers more conveniently in various fields.

However, the P.E.T container according to the prior art has several problems in that manufacturing expenses and costs are increased due to a complicated structure of the mold for forming the P.E.T container, and in that it is difficult to manufacture the P.E.T container on a mass production basis and manufacturing efficiency of the P.E.T container is considerably decreased a cycle period of time required for the injection molding is too long.

SUMMARY OF THE INVENTION

Accordingly, the present invention has been made to solve the above-mentioned problems occurring in the prior arts, and it is an object of the present invention to provide an apparatus and a method for manufacturing a transparent synthetic resin vessel with an integrated handle, which can injection-mold a handle in a vessel forming preform and automatically discharge the molded vessel from a mold, thereby manufacturing the transparent synthetic resin vessels on a mass production basis and reducing manufacturing costs because the transparent synthetic resin vessel with the integrated handle is manufactured by just a single process without additional process to attach the handle.

It is another object of the present invention to provide an apparatus and a method for manufacturing a transparent synthetic resin vessel with an integrated handle, which the transparent synthetic resin vessel is made from just one material, thereby being recycled conveniently without needing to separate raw materials.

It is a further object of the present invention to provide an apparatus and a method for manufacturing a transparent synthetic resin vessel with an integrated handle, which the handle is injection-molded integrally to a body of the transparent synthetic resin vessel, thereby enhancing bearing power and solidity when a user uses the handle of the transparent synthetic resin vessel, enhancing durability of the transparent synthetic resin vessel and securing stability in handling and use.

To achieve the above objects, the present invention provides an apparatus for manufacturing a transparent synthetic resin vessel with an integrated handle including: an upper mold carrying out a vertical movement through a vertical cylinder assembly and having a core for keeping the shape of a preform and a core block for molding a handle at one side of the preform; a fixing plate disposed below the upper mold and having rib members for fixing the preform; a rotating plate joined with the fixing plate, the rotating plate moving vertically together with the upper mold and having a rotating device for simultaneously molding the handle on one side of the preform and manufacturing a transparent synthetic resin vessel by rotating the fixing plate; a lower mold in which the preform is embedded, the lower mold being supplied with molten resin at one side thereof so as to injection-mold the handle; an injection mold for forming the preform, on which the handle has been molded, into a transparent synthetic resin vessel when the rotating plate is rotated; and a vessel separator for separating the transparent synthetic resin vessel from the vessel manufacturing apparatus.

Moreover, the fixing plate and the rotating plate are fixed and joined with each other by a fixing member, and the fixing plate has a joining portion on which the fixing member abuts.

Furthermore, the apparatus for manufacturing the transparent synthetic resin vessel further includes a compressed air supplying device which is built in the vessel separator or is mounted between the upper mold and the rotating plate for supplying compressed air to the preform on which the handle has been molded.

Additionally, the preforms are respectively fixed to the rib members and three rib members are disposed on the fixing plate at intervals of 120 degrees, so that the transparent synthetic resin vessel with the integrated handle can be manufactured by just one cycle.

In addition, each of the rib members has a block hole, through which the core block of the upper mold penetrates and is inserted into the lower mold.

Moreover, the rib member comprises an integral core block body disposed to form the core block of the upper mold integrally with the rib member.

Furthermore, the lower mold comprises a handle core block for molding the handle on the preform and a cylinder member for operating the handle core block so as to reduce the step of manufacturing the core block.

Additionally, the lower mold comprises: a guide part of a predetermined slope so that the lower mold molds the handle according to the operation of the upper mold; and a guide core vertically moving along the guide part for molding the handle on one side of the preform in close contact with the preform.

In another aspect of the present invention, the present invention provides a method for manufacturing a transparent synthetic resin vessel with an integrated handle by a transparent synthetic resin vessel manufacturing apparatus, which comprises: an upper mold carrying out a vertical movement through a vertical cylinder assembly; a rotating plate moving together with the upper mold and rotating a fixing plate having rib members; a lower mold supplied with molten resin so as to injection-mold a handle on one side of a preform; an injection mold for manufacturing a transparent synthetic resin vessel by molding the preform, on which the handle has been molded, according to the rotation of the rotating plate; and a vessel separator for separating the transparent synthetic resin vessel from the vessel manufacturing apparatus, the vessel manufacturing method comprising: a preform preparation step (a) of fixing the preform to the rib member and preparing for injection molding; a handle molding step (b) of rotating the preform to the position where the upper mold and the lower mold are disposed by the rotation of the rotating plate so as to mold the handle integrally with the preform by an injection-molding; a vessel molding step (c) of rotating the rotating plate to move the handle molded preform to the position where the injection mold and the vessel separator are disposed, so as to manufacture the transparent synthetic resin vessel after the handle molding step (b) is finished; and a vessel discharging step (d) of discharging the completely molded vessel by the vessel separator after the vessel molding step (c).

According to the present invention, the apparatus and a method for manufacturing the transparent synthetic resin vessel with the integrated handle can injection-mold the handle in the vessel forming preform and automatically discharge the molded vessel from the mold, thereby manufacturing the transparent synthetic resin vessels on a mass production basis and reducing manufacturing costs because the transparent synthetic resin vessel with the integrated handle is manufactured by just a single process without additional process to attach the handle.

Moreover, according to the present invention, the transparent synthetic resin vessel is made from just one material, and hence, is recycled conveniently without needing to separate raw materials.

Furthermore, according to the present invention, the handle is injection-molded integrally to the body of the transparent synthetic resin vessel, and hence, the present invention can enhance bearing power and solidity when a user uses the handle of the transparent synthetic resin vessel, enhance durability of the transparent synthetic resin vessel, and secure stability in handling and use.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIGS. 5 to 9(a)~9(b), 10(a)~10(b) are schematic diagrams of an apparatus for manufacturing a transparent synthetic resin vessel with an integrated handle according to another preferred embodiment of the present invention.

DETAILED DESCRIPTION OF THE PREFERRED EMBODIMENT

Figure 1:
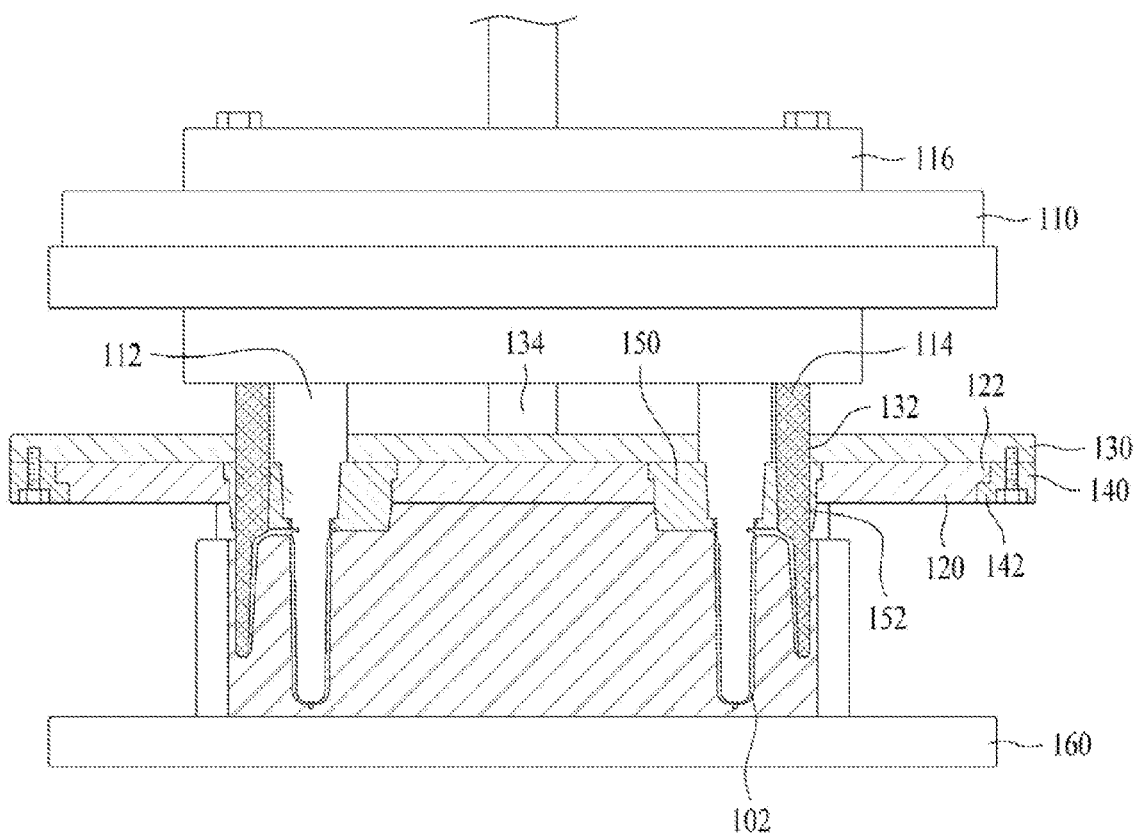
FIG. 1 is a schematic diagram of an apparatus for manufacturing a transparent synthetic resin vessel with an integrated handle according to a preferred embodiment of the present invention.

Reference will be now made in detail to the preferred embodiment of the present invention with reference to the attached drawings.

In the drawings, the same components have the same reference numerals even though they are illustrated in different figures. In addition, in the description of the present invention, when it is judged that detailed descriptions of known functions or structures related with the present invention may make the essential points vague, the detailed descriptions of the known functions or structures will be omitted.

Figure 2:
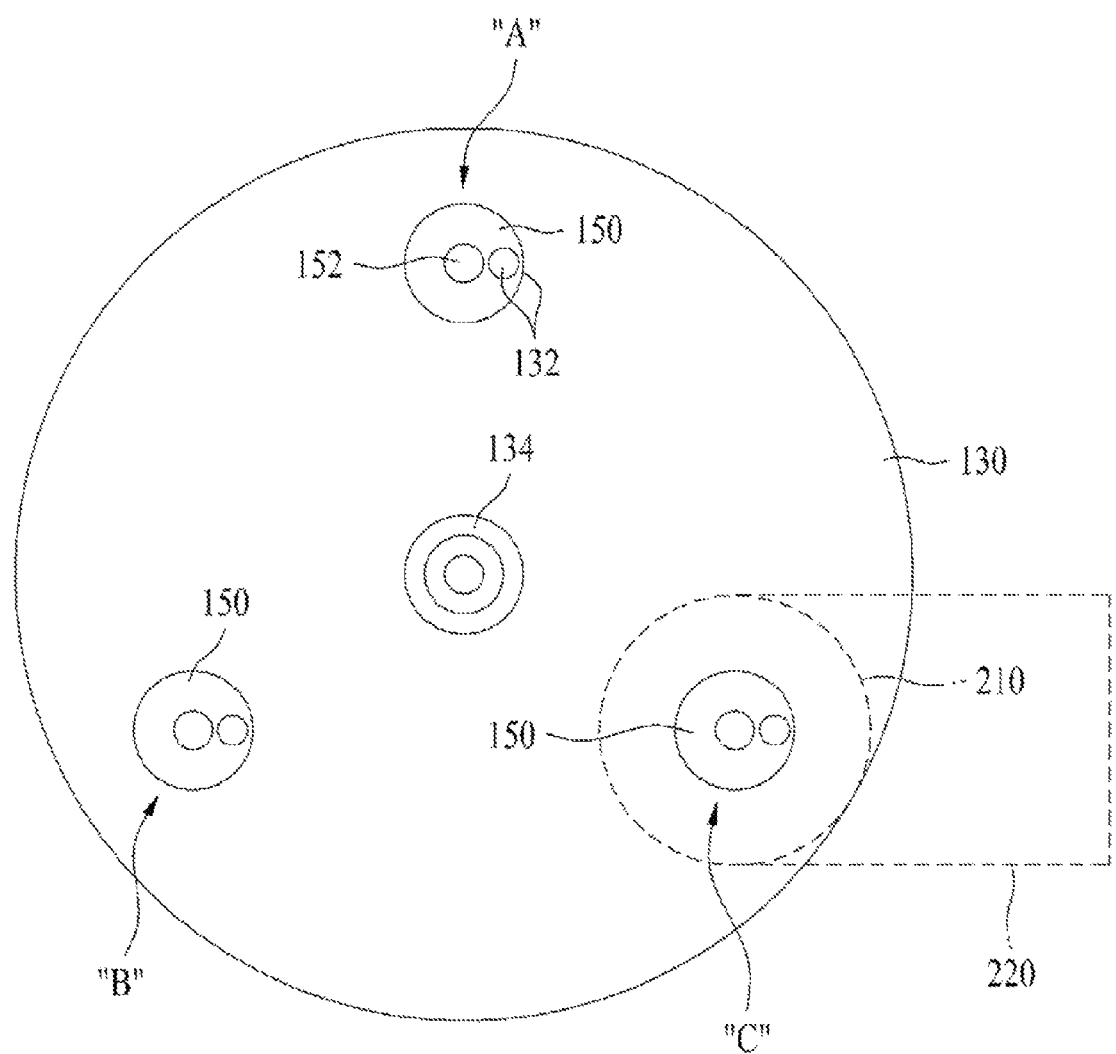
FIG. 2 is a schematic plan view of the apparatus for manufacturing the transparent synthetic resin vessel with the integrated handle.
Figure 3:
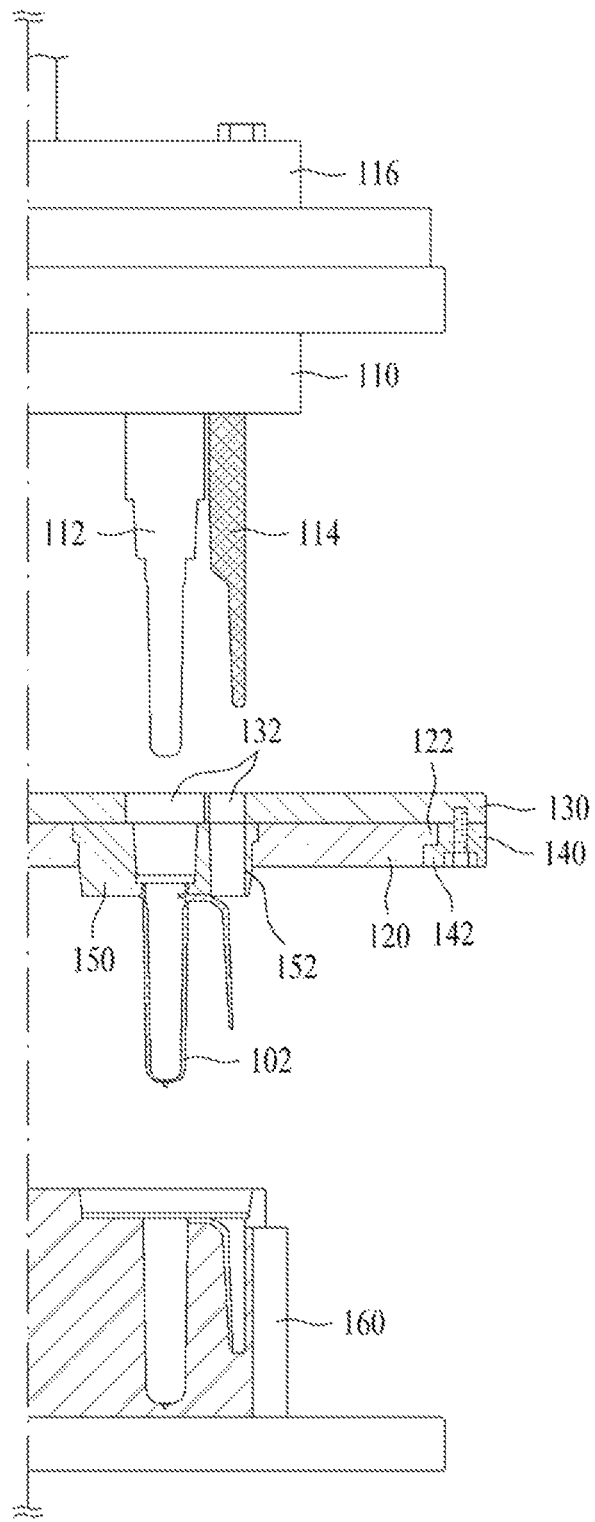
FIGS. 3 and 4 are views showing an operational process of the apparatus for manufacturing the transparent synthetic resin vessel with the integrated handle.
Figure 4:
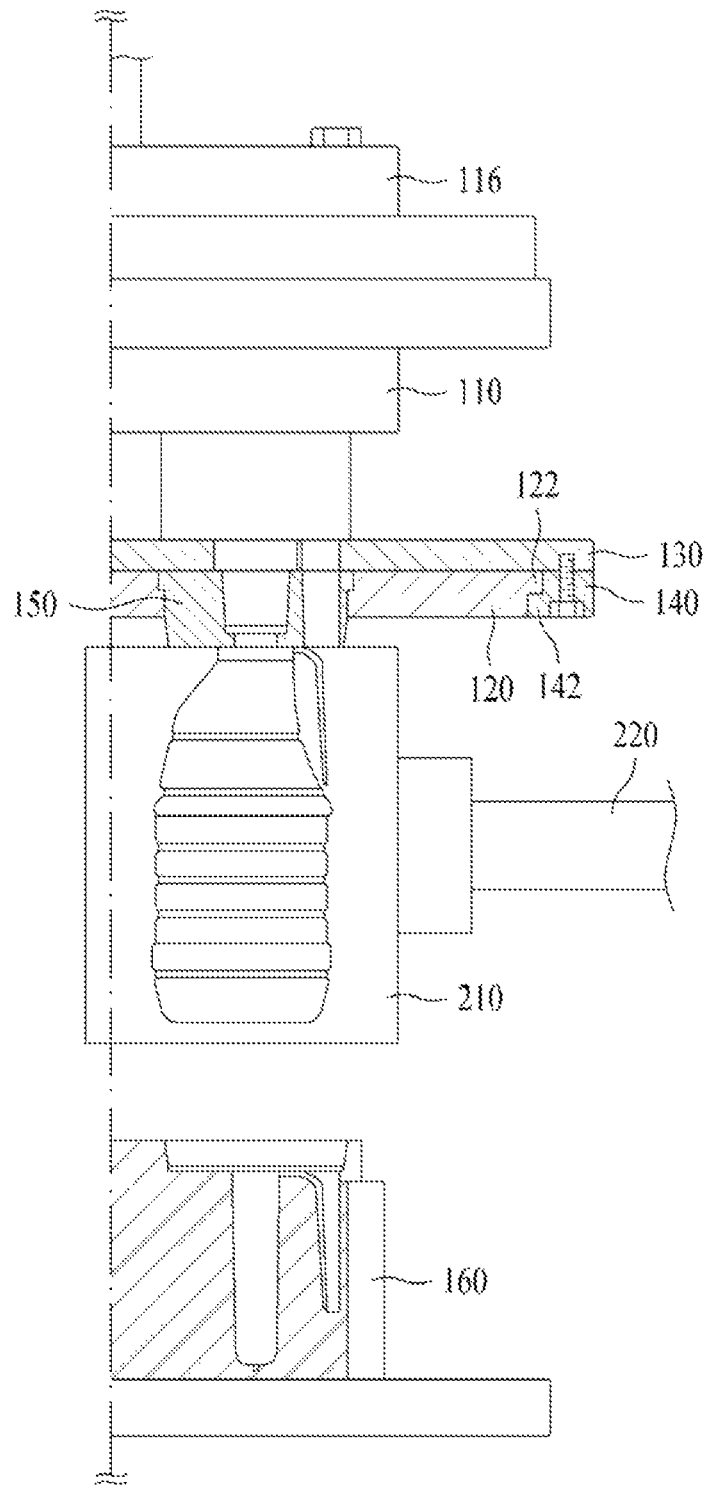
Figure 11:
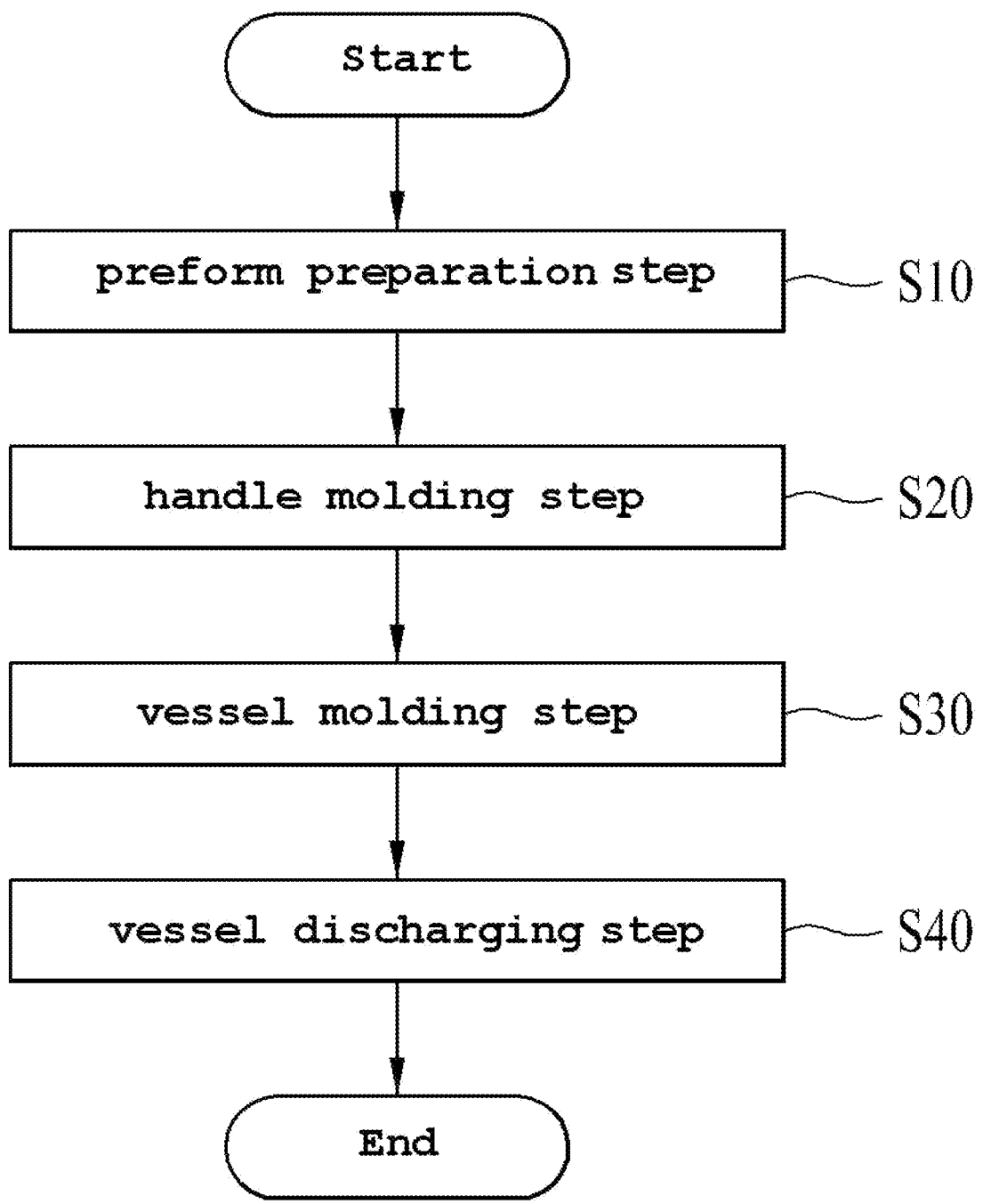
FIG. 11 is a flow chart showing a process of manufacturing the transparent synthetic resin vessel with the integrated handle according to the present invention.

FIG. 1 is a schematic diagram of an apparatus for manufacturing a transparent synthetic resin vessel with an integrated handle according to a preferred embodiment of the present invention, FIG. 2 is a schematic plan view of the apparatus for manufacturing the transparent synthetic resin vessel with the integrated handle, FIGS. 3 and 4 are views showing an operational process of the apparatus for manufacturing the transparent synthetic resin vessel with the integrated handle, FIGS. 5 to 9(a)~9(b), 10(a)~10(b) are schematic diagrams of an apparatus for manufacturing a transparent synthetic resin vessel with an integrated handle according to another preferred embodiment of the present invention, and FIG. 11 is a flow chart showing a process of manufacturing the transparent synthetic resin vessel with the integrated handle according to the present invention.

As shown in the drawings, the apparatus for manufacturing the transparent synthetic resin vessel includes: an upper mold 110 carrying out a vertical movement and having a core block 114 for forming a handle part to a preform 102 of a transparent synthetic resin vessel; a fixing plate 120 below the upper mold 110 and having a rib member 150 to which the preform 102 is fixed; a rotating plate 130 joined with the fixing plate 120 through a fixing member 140 for rotating the fixing plate 120; and a lower mold 160 adapted to injection-mold a handle to the transparent synthetic resin vessel.

The upper mold 110 is inserted into the preform 102 disposed at the rib member 150 so that a core 112 for keeping the shape of the preform 102 when the handle is molded is formed, and the core block 114 for forming the shape of the handle is disposed beside the core 112.

While the upper mold 110 vertically moves by a vertical cylinder assembly 116 joined on an upper portion thereof, the preform 102 is molded into a transparent synthetic resin vessel.

In other words, while the rotating plate 130 disposed below the upper mold 110 is rotated, the preform 102 is prepared, and the handle is formed on the preform 102. Finally, the transparent synthetic resin vessel is completely molded while the preform 102 is filled with compressed air.

In this instance, preferably, a blow mold 210 having the shape of the transparent synthetic resin vessel for manufacturing the vessel is prepared, and hence, the preform 102 to which the handle is formed is molded into the shape of the transparent synthetic resin vessel when compressed air is supplied.

Moreover, when the transparent synthetic resin vessel is completely molded, the transparent synthetic resin vessel disposed in the rib member 150 by a vessel separator 220, so that the product can be discharged out.

Here, a compressed air supplier may be built in the vessel separator 220, but the present invention is not restricted to the above, and the compressed air supplier may be disposed between the upper mold 110 and the rotating plate 130.

The fixing plate 120 is disposed between the upper mold 110 and the lower mold 160 for fixing the preform 102, and the rib members 150 are joined to the fixing plate 120 at regular spaced intervals along the circumferential direction.

Here, the preform 102 is fixed to each of the fixing plates 150, and three rib members 150 are joined to the fixing plate 120 at intervals of 120 degrees and are rotated by the rotating plate 130, so that the transparent synthetic resin vessel with the integrated handle can be manufactured by just one cycle.

The rib member 150 has a block hole 152 through which the core block 114 of the upper mold 110 penetrates and is inserted into the lower mold 160.

Furthermore, joining portions 122 which are fixed and joined to the rotating plate 130 are protrudingly formed on the circumferential surfaces of both sides of the fixing plate 120.

The rotating plate 130 is fixed and joined to the fixing plate 120 and has communication holes 132 which respectively have the same center as the rib members 150 and have the same number as the rib members 150 disposed on the fixing plate 120 so that the core 112 and the core block 114 can be inserted into the communication holes 132.

Such a rotating plate 130 has a plurality of joining holes formed in the circumferential surface so as to be fixed and joined with the fixing plate 120.

Moreover, the fixing plate 120 and the rotating plate 130 are fixed and joined with each other by the fixing member 140, and the fixing member 140 includes: a contact portion 144 for increasing a contact force with a joining portion 122 formed on the fixing plate 120 so as to enhance a fixing force; and a fastening hole to which a fixing bolt is fastened.

Furthermore, the rotating plate 130 includes a rotating device 134 disposed at the center thereof for integrally molding the handle onto the preform 102 through just one cycle by rotating the plural rib members 150 and completely molding the transparent synthetic resin vessel as soon as the handle is molded.

Additionally, the rotating plate 130 and the fixing plate 120 move according to a vertical movement of the upper mold 110, and especially, when the upper mold 110 moves upwardly, the preform 102 disposed in the rib member 150 is molded by the next process while the rotating plate 130 and the fixing plate 120 are rotated, such that the transparent synthetic resin vessel is manufactured through the just one cycle.

The lower mold 160 is constructed to mold the handle integrally with the preform 102 for molding the transparent synthetic resin vessel, and has a cooling water channel formed inside the lower mold 160 for cooling heat generated during molding.

As shown in FIG. 11, in order to manufacture the transparent synthetic resin vessel using the previously molded preform 102, the apparatus for manufacturing the transparent synthetic resin vessel according to the present invention carries out a preform preparing step (S10) of fixing the preform 102 to the rib member 150 and carrying out preparation for injection-molding.

After that, the synthetic resin vessel manufacturing apparatus carries out a handle molding step (S20) of rotating the rotating plate 130 to a position where the upper mold 110 and the lower mold 160 are disposed so as to progress the next process.

In the handle molding step, the fixing plate 120 to which the rib member 150 is joined is rotated so as to be located on the same center line between the upper mold 110 and the lower mold 160. After that, while the upper mold 110 moves downwardly, the core 112 and the core block 114 penetrate through the communication hole 132 of the rotating plate 130, so that the core 112 is inserted into the preform 102.

Moreover, while the core block 114 is inserted into the lower mold through the block hole 152 of the rib member 150, the handle is molded integrally with one side of the preform 102 by an injection-molding of the upper mold 110, the core block 114 and the lower mold 160.

After that, when the handle is completely molded, the upper mold 110 is moved upwardly so as to move the rotating plate 130 and the fixing plate 120 upwardly. When the upward movement is finished, the rotating plate 130 is rotated to the position where the injection mold 210 and the vessel separator 220 are disposed by the rotating device 134.

Furthermore, when the rotation of the rotating plate 130 is finished, while the upper mold is moved downwardly, the preform 102 disposed in the rib member 150 of the fixing plate 120 is inserted into the a blow mold 210, so that a vessel molding step (S30) of manufacturing the transparent synthetic resin vessel is carried out.

Additionally, when the vessel is completely molded, the vessel manufacturing apparatus carries out a vessel discharging step (S40) of discharging the completely molded transparent synthetic resin vessel by the vessel separator 220, so that the transparent synthetic resin vessel is completely manufactured.

As described above, the apparatus for manufacturing the transparent synthetic resin vessel with the integrated handle according to the present invention simultaneously carries out the preform preparation step, the handle molding step, and the vessel molding step while rotating the rib members 150 disposed on the fixing plate 120 according to the rotation of the rotating plate 130.

In this instance, the preform preparation step is carried out in a state where the upper mold 110 is upwardly moved to the highest side.

In other words, when the rotating plate is rotated after the preform preparation step, out of the rib members 150, while the rib member 150 located at an "A" position moves to a "B" position and the rib member 150 located at the "B" position moves to a "C" position, each of the steps are carried out at the corresponding position.

For instance, the "A" position of the rotating plate 130 is a position to prepare the preform, the "B" position is a position to mold the handle while the upper mold 110 moves downwardly, and the "C" position is a position to mold the vessel. Accordingly, when the preparation of the preform in the rib member 150 located at the "A" position is finished, the rib member moves to "B" by the rotation of the rotating plate 130, and then, the handle is molded onto the preform 102 while the upper mold 110 moves downwardly.

Moreover, when the rib member 150 located at the "A" position is rotated, the rib member 150 located at the "B" position is also moves to the "C" position so as to mold the vessel, and then, the rib member 150 located at the "C" position moves to the "A" position in order to repeatedly carry out the preform preparation step, so that the transparent synthetic resin vessel can be manufactured by just one cycle within a short period of time to thereby be manufactured on a mass production basis.

Figure 5:
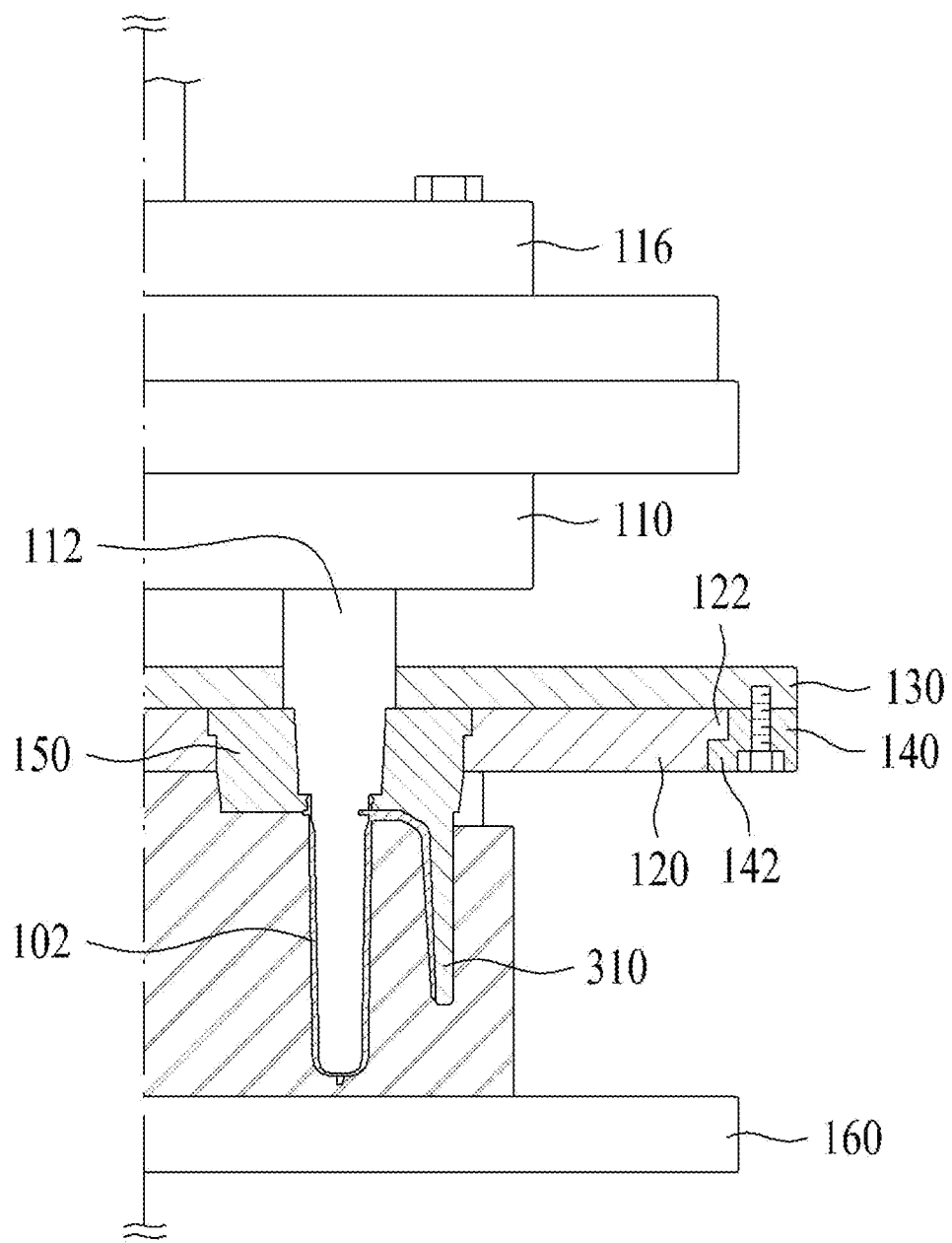
Figure 6:
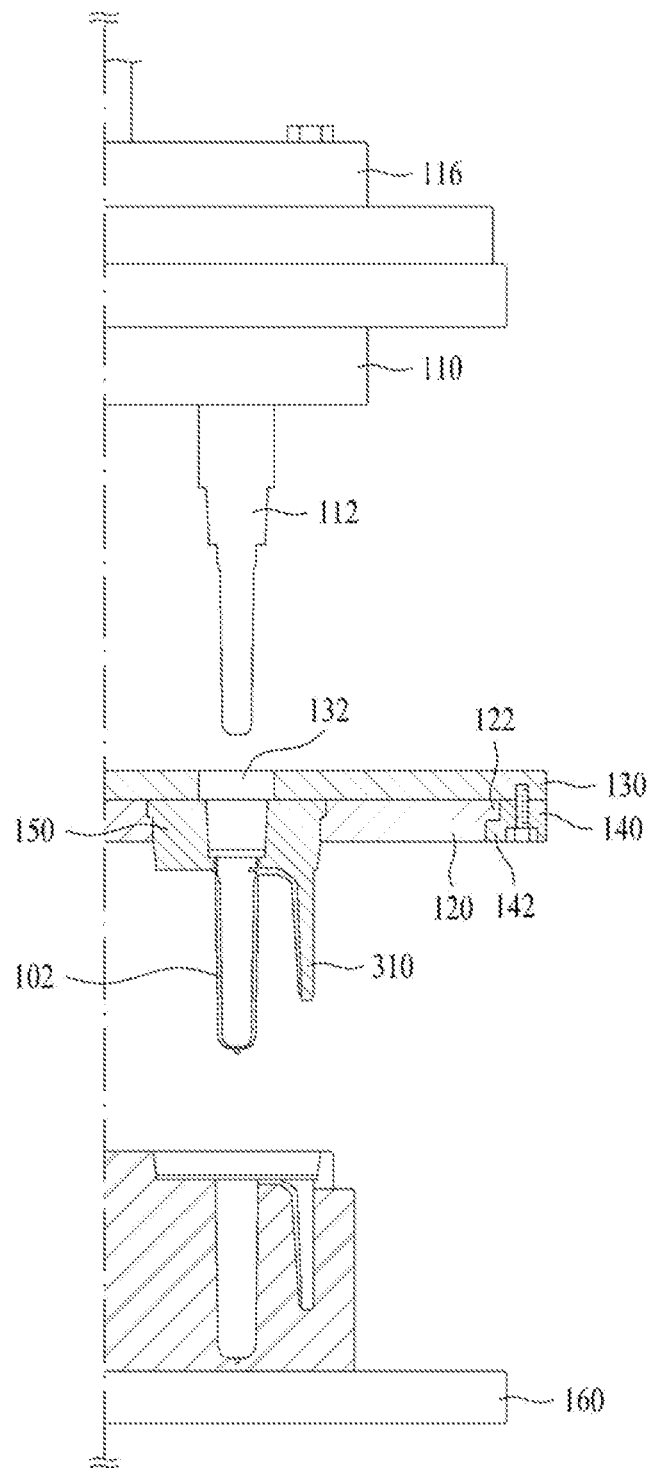

In the meantime, as shown in FIGS. 5 and 6, the apparatus for manufacturing the transparent synthetic resin vessel according to the present invention includes an integral core block body 310 in order to form the core block 114 formed on the upper mold 110 integrally with the rib member 150, so that the manufacturing apparatus can prevent undercut generated when the handle is molded and make the upper mold 110 in close contact with the lower mold 160 so as to produce high-quality products on a mass production basis.

Figure 7:
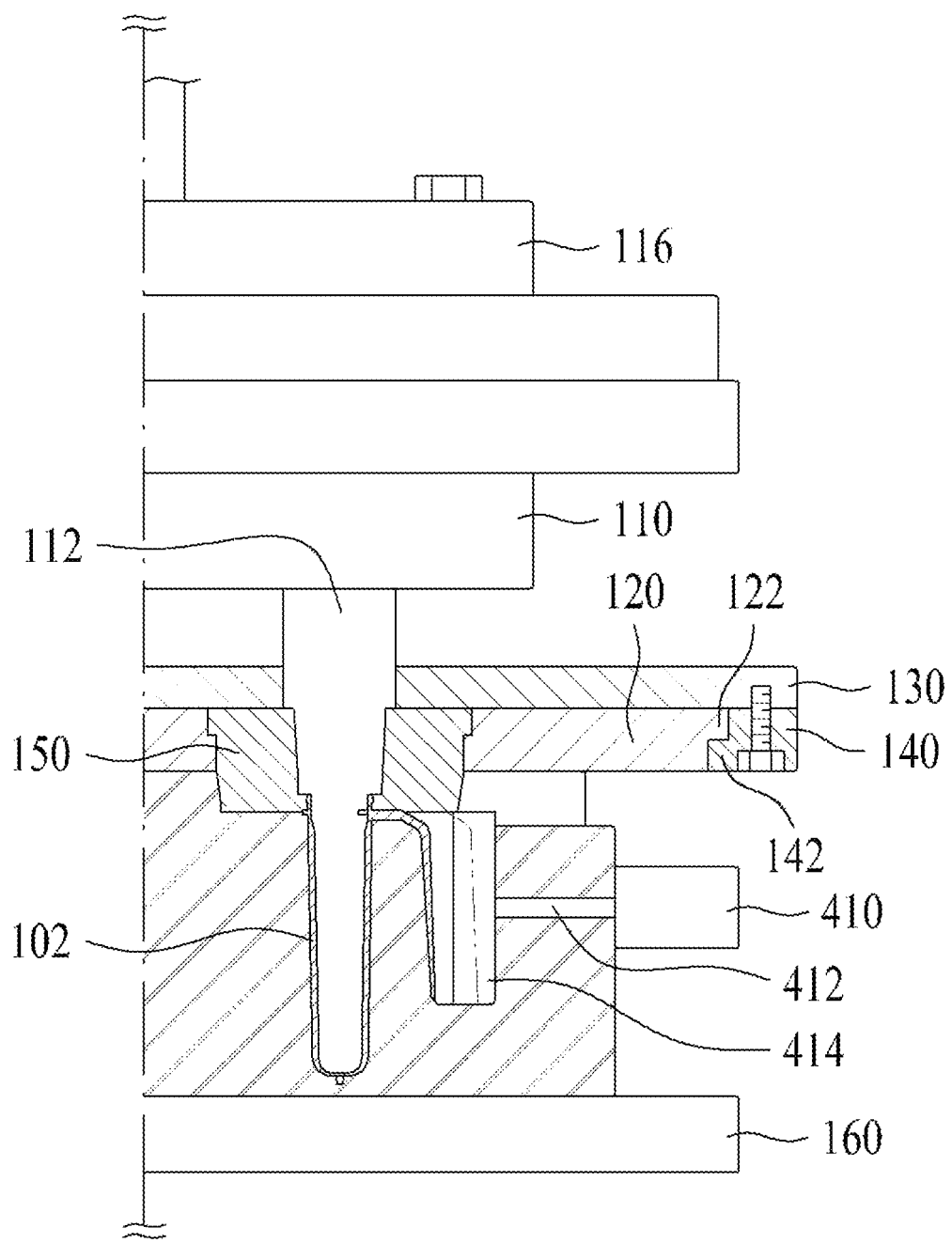
Figure 8:
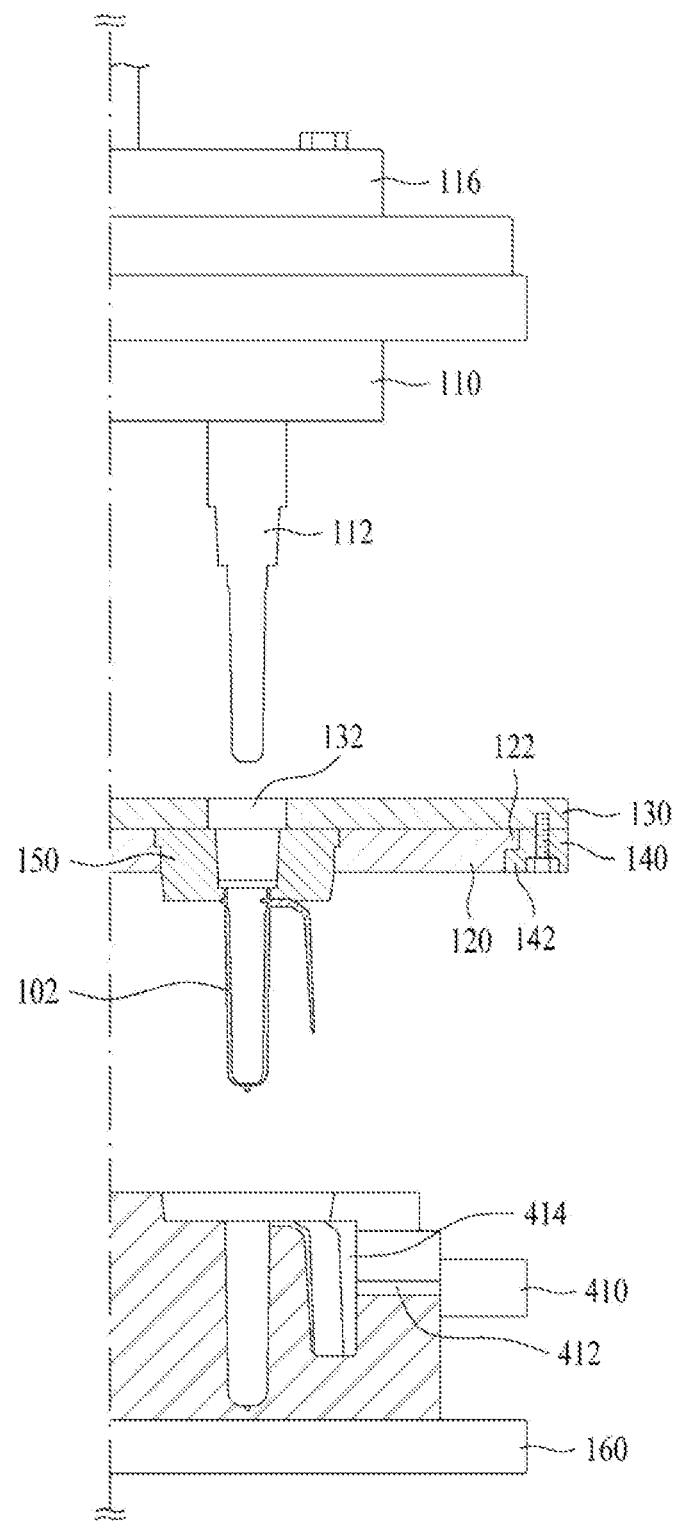
Figure 9:
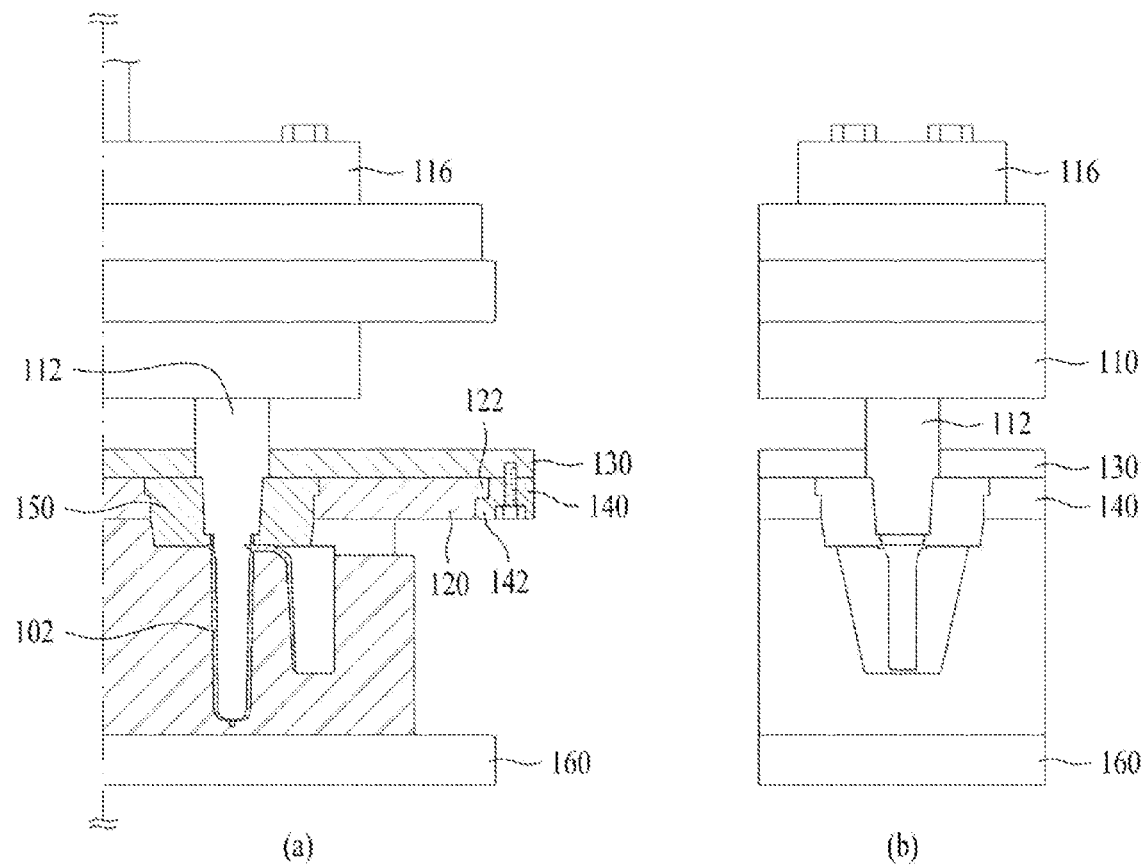
Figure 10:
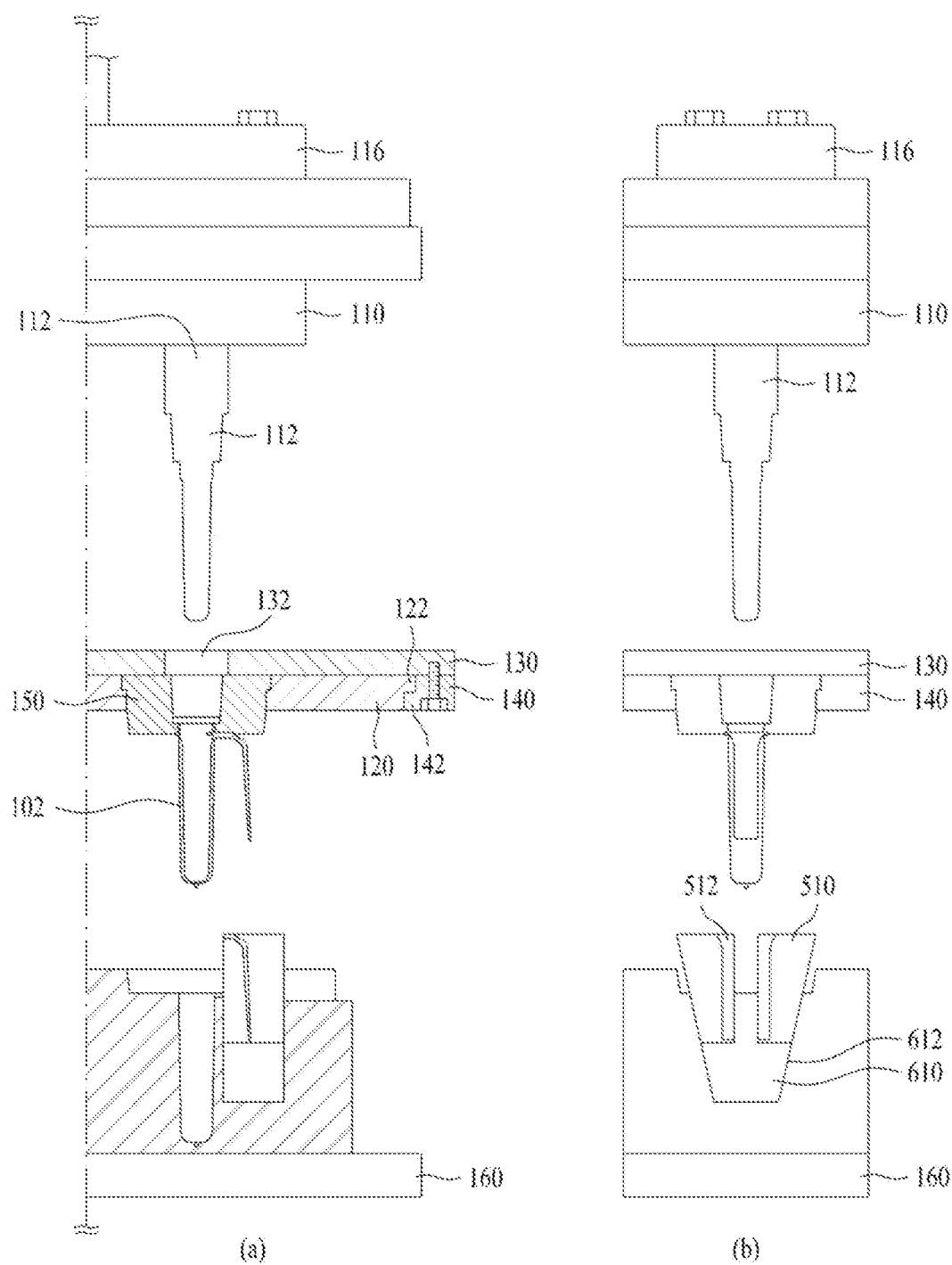

Furthermore, as shown in FIGS. 7 and 8, the apparatus for manufacturing the transparent synthetic resin vessel according to the present invention includes a cylinder member 410 disposed on the lower mold 160, and the cylinder member 410 includes a guide shaft 412 and a handle core block 414 disposed at an end portion thereof for molding the handle, so that the manufacturing apparatus can reduce the manufacturing costs of the transparent synthetic resin vessel and maximize a mass production efficiency by reducing a step of manufacturing the core block 114.

Additionally, as shown in FIGS. 9(a)~9(b) and 10(a)~10(b), the apparatus for manufacturing the transparent synthetic resin vessel according to the present invention includes a guide core 510 of a guide type disposed on the lower mold 160 and a guide part 610 of a predetermined slope formed on the lower mold 160 so as to move the guide core 510 vertically, so that the handle can be molded onto the preform 102 according to the vertical movement of the upper mold 110.

In other words, the preform is inserted into the guide core 510 while the rotating plate 130 and the fixing plate 120 are moved together by the downward movement of the upper mold 110, and the guide core 510 gets in close contact with the preform 102 while downwardly moving along a guide surface 612 formed on the guide part 610 of the lower mold 160. After that, a handle core 512 formed on the guide core 510 is filled with molten resin, so that the handle is molded integrally with one side of the preform 102.

As described above, the apparatus for manufacturing the transparent synthetic resin vessel with the integrated handle according to the present invention can injection-mold the handle in the vessel forming preform and automatically discharge the molded vessel from the mold, thereby manufacturing the transparent synthetic resin vessels on a mass production basis and reducing manufacturing costs because the transparent synthetic resin vessel with the integrated handle is manufactured by just a single process without additional process to attach the handle. Moreover, according to the present invention, the transparent synthetic resin vessel is made from just one material, and hence, is recycled conveniently without needing to separate raw materials. Furthermore, according to the present invention, the handle is injection-molded integrally to the body of the transparent synthetic resin vessel, and hence, the present invention can enhance bearing power and solidity when a user uses the handle of the transparent synthetic resin vessel, enhance durability of the transparent synthetic resin vessel, and secure stability in handling and use.

As described above, while the present invention has been particularly shown and described with reference to the example embodiment thereof, it will be understood by those of ordinary skill in the art that the above embodiment of the present invention is exemplified and various changes, and modifications may be made therein without departing from the essential characteristics and scope of the present invention. Therefore, it would be understood that the example embodiment of the present invention does not restrict the technical idea of the present invention, and the technical scope of the present invention is not restricted by the example embodiment. Moreover, it would be also understood that the technical and protective scope and idea of the present invention shall be defined by the technical idea as defined by the following claims.

What is claimed is:

1. An apparatus for manufacturing a transparent synthetic resin vessel with an integrated handle comprising:
   an upper mold carrying out a vertical movement through a vertical cylinder assembly and having a core for keeping the shape of a preform and a core block for molding a handle at one side of the preform;
   a fixing plate disposed below the upper mold and having rib members for fixing the preform;
   a rotating plate joined with the fixing plate, the rotating plate moving vertically together with the upper mold and having a rotating device for simultaneously molding the handle on one side of the preform and manufacturing a transparent synthetic resin vessel by rotating the fixing plate;
   a fixing member for fixing and joining the fixing plate and the rotating plate with each other, the fixing plate having a joining portion on which the fixing member abuts;
   a lower mold in which the preform is embedded, the lower mold being supplied with molten resin at one side thereof so as to injection-mold the handle;
   a blow mold for forming the preform, on which the handle has been molded, into a transparent synthetic resin vessel when the rotating plate is rotated; and
   a vessel separator for separating the transparent synthetic resin vessel from the vessel manufacturing apparatus.

2. The apparatus for manufacturing the transparent synthetic resin vessel according to claim 1, further comprising:
   a compressed air supplying device which is built in the vessel separator or is mounted between the upper mold and the rotating plate for supplying compressed air to the preform on which the handle has been molded.

3. The apparatus for manufacturing the transparent synthetic resin vessel according to claim 1, wherein the preforms are respectively fixed to the rib members and three rib members are disposed on the fixing plate at intervals of 120 degrees, so that the transparent synthetic resin vessel with the integrated handle can be manufactured by just one cycle.

4. The apparatus for manufacturing the transparent synthetic resin vessel according to claim 1, wherein each of the rib members has a block hole, through which the core block of the upper mold penetrates and is inserted into the lower mold.

5. The apparatus for manufacturing the transparent synthetic resin vessel according to claim 1, wherein the rib member comprises an integral core block body disposed to form the core block of the upper mold integrally with the rib member.

* * * * *